United States Patent [19]

Liu

[11] Patent Number: 6,001,213
[45] Date of Patent: *Dec. 14, 1999

[54] METHODS FOR FORMING NON-ENVIRONMENTALLY HAZARDOUS, NON-VOLATILE ADHESIVE PROMOTER COMPOSITIONS FOR CURING ADHESIVES

[75] Inventor: Ju-Chao Liu, West Hartford, Conn.

[73] Assignee: Loctite Corporation, Hartford, Conn.

[ * ] Notice: This patent is subject to a terminal disclaimer.

[21] Appl. No.: 08/807,967

[22] Filed: Feb. 28, 1997

Related U.S. Application Data

[60] Continuation of application No. 08/456,755, Jun. 1, 1995, which is a division of application No. 08/322,936, Oct. 13, 1994, Pat. No. 5,567,266.

[51] Int. Cl.$^6$ ........................................................ B32B 7/00
[52] U.S. Cl. .................... 156/310; 106/287.24; 106/311; 156/314; 206/568
[58] Field of Search ................................... 156/310, 314; 106/287.24, 311; 206/568

[56] References Cited

U.S. PATENT DOCUMENTS

| | | |
|---|---|---|
| 2,784,127 | 3/1957 | Joyner et al. . |
| 3,260,637 | 7/1966 | Von Bramer . |
| 3,266,625 | 8/1966 | Hardman . |
| 3,836,377 | 9/1974 | Delahunty . |
| 4,042,442 | 8/1977 | Dombroski et al. . |
| 4,139,693 | 2/1979 | Schoenberg . |
| 4,200,549 | 4/1980 | Okamura et al. . |
| 4,377,490 | 3/1983 | Shiraishi et al. . |
| 4,444,933 | 4/1984 | Columbus et al. . |
| 4,450,265 | 5/1984 | Harris . |
| 4,460,759 | 7/1984 | Robins . |
| 4,496,685 | 1/1985 | Nagasawa et al. . |
| 4,822,426 | 4/1989 | Ito et al. . |
| 4,869,772 | 9/1989 | McDonnell et al. . |
| 4,891,248 | 1/1990 | Kraus . |
| 4,933,234 | 6/1990 | Kobe et al. . |
| 4,979,993 | 12/1990 | Okamoto et al. . |
| 5,066,743 | 11/1991 | Okamoto et al. . |
| 5,079,098 | 1/1992 | Liu . |
| 5,232,774 | 8/1993 | Otsuka et al. ........................ 206/568 |
| 5,262,200 | 11/1993 | Puder et al. . |
| 5,314,562 | 5/1994 | McDonnell et al. . |
| 5,792,303 | 8/1998 | Liu ........................................ 156/314 |

FOREIGN PATENT DOCUMENTS

| | | |
|---|---|---|
| 624525 | 7/1961 | Canada ................................. 156/314 |
| 624525 | 8/1961 | Canada . |
| 0 220 555 | 10/1986 | European Pat. Off. . |
| 0 271 675 | 10/1987 | European Pat. Off. . |
| 0 295 930 B1 | 6/1988 | European Pat. Off. . |
| 33-164 | 7/1973 | Japan . |
| 33-162 | 10/1982 | Japan . |

OTHER PUBLICATIONS

Grenfell, Mark W., et al. "Performance Fluids For Critical Cleaning and Drying Applications." National Electronic Packaging & Production Conference West 94 Anaheim, California Proceedings, pp. 2197–2203, no apparent relevance.

*Primary Examiner*—John J. Gallagher
*Attorney, Agent, or Firm*—Hoffman & Baron, LLP

[57] ABSTRACT

A non-environmentally hazardous, non-volatile adhesive promoter composition useful in promoting the cure and/or enhancing adhesion of adhesives and for use in combination with adhesive bond polymerization. The promoter composition is a combination of a fluid carrier that remains substantially present during the curing of an adhesive composition and an active component capable of promoting the cure and/or enhancing adhesion of the adhesive and being miscible in the fluid carrier.

15 Claims, No Drawings

METHODS FOR FORMING NON-ENVIRONMENTALLY HAZARDOUS, NON-VOLATILE ADHESIVE PROMOTER COMPOSITIONS FOR CURING ADHESIVES

This is a continuation of Application No. 08/456,755 filed on Jun. 1, 1995, which is a divisional of Application No. 08/322,936 filed on Oct. 13, 1994, now U.S. Pat. No. 5,567,266.

FIELD OF THE INVENTION

This invention relates to a non-environmentally hazardous and non-volatile adhesive promoter composition for promoting the cure of adhesives and for use in combination with adhesive compositions. More particularly, the present invention relates to an adhesive promoter composition which includes a fluid carrier that remains substantially present during the curing of the adhesive composition and an adhesive promoter component capable of promoting the cure of the adhesive composition and being miscible in the fluid carrier.

BACKGROUND OF THE INVENTION

Chlorinated hydrocarbons such as 1,1,1-trichloroethane and chlorfluoro hydrocarbons (CFC), such as $C_2F_3Cl_3$ also known as FREON®, have been used for many years as solvents in numerous applications. These materials have shown to be very useful in the preparation and delivery of activator and accelerator compositions used in the adhesive field. In recent years, the use of these compounds has been substantially lessened due to their deleterious effect on the environment. Regulations have been promulgated not only in the United States but in countries throughout the world to accelerate the phase-out of environmentally destructive solvents, and in particular those which are believed to be ozone-depleting substances. In addition to laws designed to prevent the use of these substances, product labelling requirements have also been promulgated to insure notice is given as to those compounds used as alternatives. Finding acceptable alternatives, however, has been an extremely difficult task. For example, in applications such as adhesive accelerator compositions, the solvent should possess high chemical stability, non-flammability, low toxicity, yet be sufficiently volatile to readily evaporate once applied to leave the active ingredient, e.g. an amine accelerator or activator, on the surface to which it is applied. In addition to these requirements, consideration must be given to cost factors which are critical to commercial development.

Attempts to find good solvent systems which are non-ozone depleting, non-flammable, yet sufficiently volatile, have not been entirely successful. Although many materials have possessed certain of these characteristics, many have been deficient in the majority of these properties. For example, materials such as heptane, acetone, methylethyl ketone, isopropanol, and methanol are excellent solvent systems, with excellent volatility, i.e. low flash point temperatures and high vapor pressures, but are extremely flammable. Other substances such as isoparaffins, and propylene glycol ether are less flammable, but are still combustible and evaporate slower.

In co-assigned and co-pending U.S. Application Ser. No. 08/322,937 filed concurrently herewith, one solution offered for the replacement of ozone-depleting CFC carriers in adhesive promoter compositions was a unique co-solvent composition comprising an azeotropic mixture of a perfluorocarbon compound and an alkylsiloxane. This co-solvent solution was non-ozone depleting and possessed the required characteristics to be useful as a carrier for adhesive promoter compounds, including activators, accelerators, initiators and the like for promoting cure or enhancing adhesion of cyanoacrylate adhesives.

It is conventional in the art of adhesive promoters, i.e. accelerators, activators, initiators and the like, that they be carried in volatile solvents when used as separate components in conjunction with adhesive compositions. In the case of cyanoacrylate adhesives, accelerators are generally applied to a substrate surface prior to application of the adhesive. These adhesive promoter compositions, sometimes also referred to as primer compositions, are usually comprised of amine compounds dissolved in a CFC solvent, or 1,1,1-trichloroethane, which as discussed above is no longer considered an environmentally safe material due to its ozone-depleting nature.

Numerous patents describe the use of volatile solvents as carriers for adhesive promoter compositions, such as activators, accelerators and the like. Such adhesive promoter compositions are used in conjunction with the cure of cyanoacrylate adhesives, olefinic adhesives, anaerobic adhesives and two-part acrylic systems. For example, U.S. Pat. No. 3,260,637 describes a method of bonding a cyanoacrylate adhesive using amines dissolved in a volatile carrier solvent preferably having a boiling point below about 100° C. U.S. Pat. No. 4,822,426 discloses a primer solution consisting of an organometallic compound combined with a fluorine-containing compound, for use with difficult to bond to non-polar resins, such as polyolefins. The primer composition is applied with a volatile solvent.

U.S. Pat. No. 3,836,377 discloses an adhesive composition which consists of a monomeric ester of cyanoacetic acid and a polymerization accelerator which can be applied by means of a volatile solvent. U.S. Pat. No. 4,979,993 teaches the use of a primer composition consisting of a tertiary ammonium carboxylate compound carried by a low surface tension organic solvent. This reference also teaches that the solvent should readily evaporate to allow for the reaction of the primer with the adhesive.

In two-part adhesive compositions, where a curable component is present in one part and a curing agent is present in a second part, the curing agent and/or accelerator is generally applied with vehicles such as lower alcohols and in some cases water. For example, see U.S. Pat. No. 4,460,759, which teaches the removal of the solvent prior to bringing the surfaces together to initiate the bonding reaction.

U.S. Pat. No. 4,933,234 discloses primed polymeric substrates having at least one organic nucleophilic graft-polymerizable monomer or salt thereof graffed thereon. Various amine-bearing monomers are disclosed and the monomer compositions may be applied using solvents, crosslinking agents and surfacts.

Traditional cyanoacrylate adhesives have incorporated a variety of additives directly into the adhesive composition per se to strengthen the bond. These additives have conventionally been directly incorporated into the adhesive composition and are not handled as a separate component, in contrast to typical accelerator and activator compositions. These additives, in the case of U.S. Pat. No. 4,139,693 included an adhesion promoter of the formula:

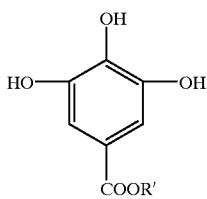

wherein R' is hydrogen or an alkyl, aryl or cycloalkyl group having 1 to 10 carbon atoms. The formal name given to this class of compounds is 3,4,5-trihydroxybenzoic acid or esters thereof. In addition to the adhesion promoter, an inhibitor is also added to the cyanoacrylate adhesive composition to stabilize the mixture from prematurely curing.

U.S. Pat. No. 2,784,127 discloses cyanoacrylate adhesive compositions which are plasticized by the addition of alkyl ester in aliphatic dicarboxylic acid of the formula, $R_1OOC—(CH_2)_n—COOR_1$ wherein n is a whole integer in the range of 1–8 and $R_1$ is an alkyl group from 1 to 8 carbon atoms. Also disclosed are alkyl phosphates in which each alkyl group contains from 1 to 8 carbon atoms, as well as triaromatic phosphates such as triphenylphosphate and tricresyl-phosphate. These plasticizers are dissolved in the monomeric cyanoacrylate adhesive to prevent failure of the adhesive bond after aging. Up to about 20% of the plasticizers are disclosed as being incorporated. The plasticizers allegedly function to add flexibility to the bond without adversely affecting the degree of adhesion. No disclosure is given to the addition of a promoter component into the adhesive composition per se.

As is evident from the discussion, the art is replete with examples of volatile solvents as carriers for adhesion promoter compositions. This is the case whether the adhesion promoter be an activator, accelerator, catalyst or initiator system. Solvents have not historically been welcome in the bonding process since they weaken the adhesive bond, interfere with the adhesive bonding process, prevent contact between the adhesive and the substrate and in some instances, attack the adhesive and/or the substrate.

The present inventor has discovered that using a fluid carrier other than a volatile solvent to dissolve an adhesion promoter component, carry it to the substrate and incorporate itself into the adhesive composition during bonding, alleviates these difficulties. Thus, rather than approach the environmental problem of ozone depletion using a non-ozone depleting volatile solvent, the present invention utilizes a substantially non-volatile fluid carrier which is miscible in the promoter, delivers the promoter component to the substrate surface and remains incorporated in the adhesive.

It is clear that there is a need for such a non-volatile, non-ozone depleting fluid carrier which is capable of sufficiently carrying the adhesive promoter component to the substrate surface, as well as being incorporated into the adhesive composition during the bonding process without interfering with polymerization.

SUMMARY OF THE INVENTION

The present invention is directed to an adhesive promoter composition for promoting the cure and/or enhancing the adhesion of adhesive compositions that includes a fluid carrier, which remains substantially present during the cure of the adhesive composition, and an adhesive promoter component being miscible in said fluid carrier and being capable of promoting the cure of the adhesive composition. The fluid carrier of the adhesive promoter composition is substantially non-volatile and remains incorporated in the adhesive composition during cure. The adhesive promoter component can be any active ingredient that is used to prepare a surface for bonding or to promote the curing of the adhesive in the bonding process. For purposes of this invention, the term "active" will mean the adhesive promoter component. The active component is combined with the non-volatile fluid carrier to comprise the adhesive promoter composition. For example, in a preferred embodiment of the present invention, the adhesive promoter component is typically an amine or amino-bearing compound used to cure cyanoacrylate adhesive compositions. Other examples include organometallic compounds used as primers for anaerobic adhesive compositions.

As previously described, activator compositions typically used in conjunction with these types of adhesive compositions employ volatile solvents to carry the activator component to the substrate surface. The present invention clearly represents a departure from solvent carriers which served only to transport the active and were subsequently removed or flashed-off prior to contacting the adhesive composition. Rather, the present invention employs a non-volatile fluid carrier which participates not only by transporting the adhesive promoter component, but also by further serving to plasticize the adhesive composition during cure. In a preferred embodiment, the fluid carrier has at least one unsaturated molecular bond present to overcome the tendency of certain saturated esters from attacking particular plastic substrates.

The non-volatile fluid carrier is generally an ester having a boiling point about 100° C. or more and which is fluid at room temperature.

DETAILED DESCRIPTION AND PREFERRED EMBODIMENTS

Adhesive promoter compositions of the present invention provide a novel approach to the curing of adhesive compositions in adhesive bonding. The promoter composition includes a substantially non-volatile fluid carrier that remains present during the curing of an adhesive composition and an adhesive promoter component being miscible in the fluid carrier and being capable of promoting the cure and/or enhancing the adhesion of an adhesive composition. Rather than functioning like conventional volatile solvents, as temporary carriers which are intended to evaporate once the activator component is deposited, the fluid carrier of the present invention is incorporated into the adhesive composition. Thus, whereas conventional solvents negatively affected the cure and bonding of adhesives to substrates, the present compositions contribute in a positive way to the overall properties of the adhesive. These effects are in addition to the environmental advantages obtained because (the fluid carrier does not evaporate) or cause undesirable waste product.

For purposes of this invention, the term "promoter composition" is meant to be interpreted in the broadest sense as including accelerating, activating, initiating and other adhesive promoting compositions which may be used in two part systems and applied to the surface of a substrate prior to contacting the substrate with an adhesive. Also for purposes of this invention, the term "non-volatile" will mean that the boiling point of the ester is about 100° C. or greater.

Although the function of the fluid carrier once incorporated into the adhesive composition is not fully understood, and without wishing to be bound by any one theory, it is believed that the fluid carrier serves to plasticize the adhesive. The fluid carrier thus serves as a useful additive in the adhesive composition, in addition to serving its primary purpose of transporting the adhesive promoter component onto the substrate.

More specifically, the non-volatile fluid carrier may be selected from the group consisting of esters which have a boiling point of about 100° C. or greater and which are fluid at room temperature. These esters may be formed from the reaction of alkyl or aromatic carboxylic acids with alkyl or aromatic alcohols. Other methods of preparing esters useful in the present invention are also contemplated. More specifically, the fluid carrier is preferably selected from the group consisting of an acetic ester of a $C_3$–$C_{18}$ alkyl alcohol, an acetic ester of a $C_2$–$C_{18}$ alkenyl or aryl alcohol, an acetic ester a $C_3$–$C_{18}$ allyl alcohol, an acetic ester of a $C_7$–$C_{18}$ alkaryl alcohol, an acetic ester of a $C_7$–$C_{18}$ aryalkyl alcohol and mixtures thereof. The aforementioned esters are particularly useful due to their commercial availability and ease of use.

Other useful non-volatile fluid carriers contemplated within the scope of the present invention include those formed from the reaction of aromatic carboxylic acids, such as phthalic acid, with alkyl alcohols. Diethyl phthalate, dipropyl phthalate, dibutyl phthalate and dioctyl phthalate are typical examples of these. Other useful esters include esters of aromatic alcohols with alkyl carboxylic acids, such as linalyl acetate, and phenethyl acetate.

The fluid carrier may also be a benzoic diester of an alkyl glycol of the formula:

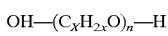

wherein x is 2-3 and n may be 1 up to about 10, provided the glycol remains fluid at about room temperature. Non-limiting examples include ethylene glycol dibenzoate, diethylene glycol dibenzoate, propylene glycol dibenzoate, dipropylene glycol dibenzoate and mixtures thereof.

In addition, the fluid carrier may also be an acetic ester of phenol.

It is preferred that the fluid carrier have at least one unsaturated bond present. This is to prevent the tendency of saturated esters to attack certain plastic substrates. It has been found that when unsaturated bonds are present, this tendency is alleviated. Since plastic substrates are a primary bonding surface for many adhesives, particularly cyanoacrylate adhesives, this feature is important in these applications.

The active component of the promoter compositions may be selected from a wide variety of adhesive promoter compounds and materials. The particular promoter component will, of course, depend on the adhesive composition to be employed and the function of the component, as well as the type of substrate to be bonded. Cyanoacrylates, anaerobics, acrylics, epoxies and olefins each have classes of compounds which activate, accelerate or otherwise promote their cure and/or enhance adhesion.

The fluid non-volatile carriers of the present invention have been found to be particularly useful with activator compounds for use with cyanoacrylate adhesive compositions. Cyanoacrylate adhesives are rapid setting materials which have excellent utility in bonding a variety of materials. The polymerization of cyanoacrylate adhesives is catalyzed using anionic materials such as hydroxyl- or amine-containing compounds. In the present invention, these compounds can be selected from a wide variety of materials which include:

a) organic or inorganic substituted and unsubstituted amines such as primary, secondary and tertiary amines and their salts;
b) N-substituted alkanoamines;
c) acylated N-substituted alkanoamines;
d) polyamines, such as diamines;
e) heterocyclic amines such as the diazabicyclo or triazabicyclo compounds disclosed in U.S. Pat. No. 4,869,772 and having the formulas:

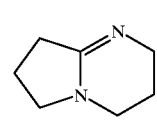

(I)

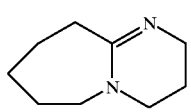

(II)

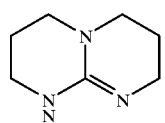

(III)

f) tertiary ammonium carboxylate compounds disclosed in U.S. Pat. No. 5,066,743 and having the formula:

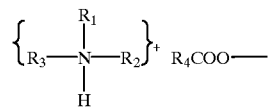

wherein $R_1$, $R_2$, $R_3$ and $R_4$ may each vary independently of each other and may be selected from the group consisting of alkyl, alkenyl, alkynyl, alkylaryl and arylalkyl, and preferably wherein at least one of $R_1$, $R_2$ and $R_3$ is a long chain alkyl moiety having 6–20 carbon atoms and $R_4$ is selected from the group consisting of alkyl and alkenyl;

g) phosphazene compounds including ring or chain polymers containing alternating phosphorus and nitrogen atoms, such as disclosed in U.S. Pat. No. 4,496, 686;

h) ethylenediamine compounds such as those disclosed in U.S. Pat. No. 5,314,562 and having the formula:

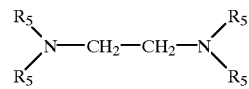

wherein each $R_5$, which may be the same or different, represents hydrogen, an alkyl, alkenyl or alkoxy group having 1 to 8 carbon atoms, an aryl group having 6 to 8 carbon atoms, a nitrogen-, silicon- or silicon-substituted group having 1 to 8 carbon atoms or a heterocyclic group having up to 8 carbon atoms which may be unsubstituted or substituted with hydroxy, ether oxygen or sulphur;

i) quaternary ammonium compounds useful as primers for improving the adhesion, as disclosed in U.S. Pat. No. 5,079,098, having the formula:

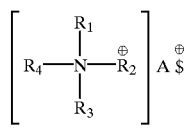

wherein $R_1$, $R_2$, $R_3$, and $R_4$ may each vary independently of the others and are selected from the group consisting of alkyl, hydroxyalkyl, aryl, alkaryl, aralkyl and alkenyl, optionally substituted with heteroatoms; and A– is an anion whose pKa value in deprotonation equilibrium reaction is greater than about 0.

Among the preferred class of amines are the acylated N-substituted alkanoamines such as dimethyl-para-toluidine (DMPT). DMPT has been found to be particularly useful in the present invention as the activator component to promote the cure of cyanoacrylate adhesives.

Generally, the promoter component, i.e. active component, is present in the adhesive promoter composition in amounts which are effective to produce the required cure speed and tensile strength. The active component of the present invention may be present in amounts of about 0.1% to about 10% by weight of the activator composition. Preferably, the activator component is present in the composition in amounts of about 0.5% to about 5.0% and most preferably, about 0.5% to about 1.0% by weight. It is preferred to apply the adhesive promoter composition at the lowest effective concentration to decrease cost and increase ease of application, as well as allow the active to be close to the thickness of a monomolecular layer. Typically, one application of the activator composition on one side of the substrate is sufficient, but multiple coatings may of course be applied.

In addition to the fluid carrier and active component, the adhesive promoter composition may contain other materials and conventional additives useful in adhesive promoter compositions. These include, without limitation, stabilizers, viscosity modifiers, odor-masking agents, coloring agents and the like.

The activator compositions of the present invention can be used on numerous types of bonding surfaces, such as steel, plastic, glass and wood. These compositions provide a more environmentally-friendly alternative to conventional solvent-containing adhesive promoter compositions, and do not attack most engineering plastics. Additionally, they are non-ozone depleting, non-flammable and non-combustible.

The adhesive promoter compositions of the present invention may be applied to the substrate to be bonded in any manner that is satisfactory to enhance cure speed and/or adhesion of the cyanoacrylate bondant to the substrate. For example, spraying, dipping, brushing, swabbing, wiping, roller-coating, etc. of the activator composition onto one or more of the substrate surfaces prior to application of the adhesive is preferred.

The thickness of the adhesive promoter composition and adhesive layer may vary widely, depending on the character and composition of the substrate surfaces, the particular adhesive and active to be employed, as well as the end use of the final bonded assembly. With any given set of parameters, acceptable and optimum thicknesses may be determined by lapshear tensile strength values for particular samples at various primer and adhesive layer thicknesses. The adhesive layer of about "0" to about 5 mils and as great as about 10 mils have been found to be generally satisfactory for most substrates.

Those plastic materials with which the adhesive promoter compositions have been shown to be effective include, without limitation, polycarbonate, polyphenylene ether alloy, polyphenylene sulfide, polyphenylene oxide, nylon, melamine, polyacetal, polycarbonate, polyesters, acrylic, acrylonitrile butadiene styrene (ABS), cellulose acetate, ethylene, vinyl, acetate (EVA) ionomer, polyarulether, polyethylene, polypropylene, polybutylene, polyallomer, polymethylpentane, polystyrene, polysulfone, polyvinyl chloride (PVC), styrene acrylonitrile (SAN), styrene butadiene, epoxides and phenolics, among others.

Suitable cyanoacrylate adhesives for use with the present invention are represented by the general formula:

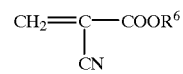

wherein $R^6$ is alkyl, alkenyl, cycloalkyl, aryl, alkoxalkyl, aralkyl, haloalkyl or other suitable group. The lower alkyl alpha-cyanoacrylates are preferred. In particular, these include methyl, ethyl, n-propyl, n-butyl, isobutyl, isopropyl, allyl, cyclohexyl, methoxyethyl, methoxypropyl, cyclohexyl, n-pentyl, allyl, and ethoxyethyl cyanoacrylates.

In applications where structural engineering adhesives are employed such as anaerobic adhesives, the adhesive promoter compositions may contain components which interact with the initiator present in the adhesive composition to further speed the cure. For example, tertiary alkyl amines, rhodamine, organic hydrazides, alkoxy amines, as well as organometallic compounds such as ferrocene, are conventionally used.

The present invention also contemplates a method of bonding substrate surfaces together with an adhesive composition. This method includes treating a surface of at least one substrate with an adhesive promoter composition which includes a fluid carrier that remains present during the cure of said adhesive composition and an adhesive promoter, i.e. active, component which is capable of promoting the cure or enhancing adhesion of said adhesive composition and is miscible in said fluid carrier. Subsequent to treatment of the substrate surface with the adhesive promoter composition, an adhesive composition is applied to at least one of the substrate surfaces, either the treated surface or the non-treated surface, and bonding of the substrate surfaces is effectuated by placing them in contact with each other and permitting polymerization to occur.

In another aspect of the present invention, an adhesive kit comprises two parts co-located in a single package whereby the first part includes an adhesive promoter composition comprising a fluid carrier which remains present during the cure of an adhesive composition and a promoter component which is miscible in said fluid carrier and promotes the cure and/or adhesion of said adhesive composition; and a second part which includes an adhesive composition, the cure of which is promoted by said adhesive promoter composition.

The features and advantages of the present invention will be more clearly understood by reference to the following examples, which are illustrative of certain preferred embodiments, but are not to be construed as limiting the scope of the present invention.

EXAMPLES

Adhesive promoter compositions of the present invention, as well as control compositions, were formulated as shown in Table 1, below. Compositions 1–14 represent activator compositions which use the non-volatile fluid carrier of the present invention.

TABLE 1

ADHESIVE PROMOTER COMPOSITIONS

| Activator Composition | Non-volatile fluid carrier | Active Component (% weight) | Adhesive Type |
|---|---|---|---|
| 1 | dipropylene glycol dibenzoate | 0.2 BBTS | ethyl cyanoacrylate (rubber containing) |
| 2 | dipropylene glycol dibenzoate | 0.2 BBTS | ethyl cyanoacrylate (gel with silica) |
| 3 | dipropylene glycol dibenzoate | 0.4 BBTS | ethyl cyanoacrylate (rubber containing) |
| 4 | dipropylene glycol dibenzoate | 0.4 BBTS | ethyl cyanoacrylate (gel with silica) |
| 5 | dipropylene glycol dibenzoate | 0.5 BBTS | ethyl cyanoacrylate (gel with silica) |
| 6 | dipropylene glycol dibenzoate | 0.5 BBTS | ethyl cyanoacrylate (with thickener) |
| 7 | phenethyl acetate | 0.5 BBTS | ethyl cyanoacrylate (gel with silica) |
| 8 | phenethyl acetate | 0.5 BBTS | ethyl cyanoacrylate (with thickener) |
| 9 | linalyl acetate | 0.8 DMPT | ethyl cyanoacrylate (gel with silica) |
| 10 | linalyl acetate | 0.8 DMPT | ethyl cyanoacrylate (with thickener) |
| 11 | linalyl acetate | 0.5 DMPT | ethyl cyanoacrylate (gel with silica) |
| 12 | linalyl acetate | 0.5 DMPT | ethyl cyanoacrylate (with thickener) |
| 13 | 1:1 linalyl/phenbutyl acetate | 0.5 DMPT | ethyl cyanoacrylate (gel with silica) |
| 14 | 1:1 linalyl/phenbutyl acetate | 0.5 DMPT | ethyl cyanoacrylate (with thickener) |
| Prior Art | Volatile Solvent Carrier | | |
| 15 | FREON TA | 0.75 DMPT | ethyl cyanoacrylate (gel with silica) |
| 16 | FREON TA | 0.75 DMPT | ethyl cyanoacrylate (with thickener) |
| 17 | FREON TA | 0.5 DMPT | ethyl cyanoacrylate (with thickener) |
| 18 | heptane | 0.2 BBTS | ethyl cyanoacrylate (rubber containing) |
| 19 | heptane | 0.2 BBTS | ethyl cyanoacrylate (gel with silica) |

BBTS - N-t-butyl-2-benzothiazolesulfenamide
DMPT - dimethyl-p-toluidine
Freon TA - Dupont registered tradename for a mixture of trifluorochlorocabon-113 with 10% acetone.

Compositions 15–18 represent conventional volatile, ozone-depleting solvents used to carry the active component. As shown in the table, various percents of the amine active component were included in the compositions. The column labeled "Adhesive Type" lists the type of cyanoacrylate used in combination with the activator composition to bond grit-blasted, steel lapshears together for tensile-shear testing. Subsequent to grit-blasting, the lapshear specimens were brushed with the respective activator compositions and the indicated adhesive applied using a 10 mil bondline gap. All cure was effectuated at room temperature. Bond strength tests were performed using standard ASTM procedures. These tests were performed at various time periods subsequent to initial mating of the lapshear parts, as well as subsequent to heat aging. The results are indicated in Table 2 below.

TABLE 2

CYANOACRYLATE ADHESIVE TENSILE BOND STRENGTH (PSI)

| | 2 HOURS AT ROOM TEMPERATURE | 24 HOURS AT ROOM TEMPERATURE | 1 WEEK AT 60° C.** | 2 WEEKS AT 60° C.** |
|---|---|---|---|---|
| INVENTIVE ACTIVATOR COMPOSITION | | | | |
| 1 | — | 2339.33 | 2496.67 | 2718.00 |
| 2 | — | 2590.67 | 2045.33 | 2613.33 |
| 3 | — | 1866.00 | 2235.33 | 2709.33 |
| 4 | — | 1512.00 | 1462.00 | 1948.00 |
| 5 | 1244 | — | 1633 | — |
| 6 | *1068 | — | *1589 | — |
|   | 1471 | — | 1474 | — |
| 7 | 2464 | — | 1587 | — |
| 8 | *2528 | — | *2544 | — |
|   | 1549 | — | 1810 | — |
| 9 | 1340 | — | 1227 | — |
| 10 | 1990 | — | 1873 | — |
| 11 | 1381 | — | 1352 | — |
| 12 | *1465 | — | *1481 | — |
|   | 1711 | — | 1852 | — |
| 13 | 2078 | — | 1571 | — |
| 14 | *1728 | — | *1595 | — |
|   | 1572 | — | 1709 | — |
| PRIOR ART ACTIVATOR COMPOSITION | | | | |
| 15 | 2134 | — | 1892 | — |
| 16 | 2380 | — | 2672 | — |
| 17 | 1483 | — | 2221 | — |
| 18 | — | 3003.33 | 3794.00 | 2932.00 |
| 19 | — | 1976.67 | 1887.33 | 1710.67 |

*more than one test conducted
**cured at room temperature 24 hours prior to aging As evidenced by Table 2 above, cyanoacrylate adhesive compositions, when used in conjunction with the inventive adhesive promoter compositions, exhibit tensile bond strengths comparable to those results obtained when traditional volatile, ozone-depleting solvents are used in the promoter compositions. In certain instances, bond strengths increased after aging (compositions 1–4). In other instances, tensile bond strengths obtained after twenty-four hours of cure were lower than those taken after two hours. This is believed to be due in part to molecular adjustment which is known to occur when amine accelerating actives are used in combination with cyanoacrylate adhesives. As shown in the table, tensile bond strengths subsequently increase, in some instances substantially, after heat aging.

To demonstrate the utility of the inventive adhesive promoter compositions on a variety of plastic substrates, various plastic surfaces were coated with the fluid carrier portion of the adhesive promoter composition to determine its effect, if any, on the plastic. In particular, the fluid carrier was brushed on the plastic surface and observed for any visible effect such as clouding, etching, or crazing of the plastic. Compositions 1, 7, and 9 represent fluid carriers of the present invention. Compositions 20, 21, and 22 represent conventional volatile solvent carriers and are dipentene, terpenes and acetone, respectively. The results are shown on Table 3 below.

TABLE 3

EFFECT OF FLUID CARRIER ON VARIOUS PLASTIC SUBSTRATES

| PLASTIC SUBSTRATE | Inventive Non-volatile carrier | | | Prior Art Solvents | | |
|---|---|---|---|---|---|---|
| | 1 | 7 | 9 | 20 | 21 | 22 |
| Polycarbonate (PC) | X | ○ | X | X | X | ○ |
| Prevex* (polyphenylene ether alloy) | X | ○ | X | X | X | X |
| Supec* (polyphenylene sulfide) | X | X | X | X | X | X |
| Noryl* (polyphenylene oxide) | X | X | ○ | ○ | ○ | ○ |
| Ultem* | X | X | X | X | X | X |
| Nylon | X | X | X | X | X | X |
| Melamine | X | X | X | X | X | X |
| Delrin* (polyacetal) | X | X | X | X | X | X |
| Xenoy* Polycarbonate/polybuytlene-terephthalate (PC/PBT) | X | ○ | X | X | X | ○ |
| Valox* ((PBT) | X | X | X | X | X | X |
| Acrylic | X | ○ | X | X | X | ○ |
| Acrylonitrile Butadiene Styrene | X | ○ | X | X | X | ○ |
| Cellulose Acetate | X | X | X | X | X | ○ |
| Ethylene Vinyl Acetate | X | X | X | X | X | X |
| Ionomer | X | X | X | X | X | X |
| Polyallomer | X | X | X | X | X | X |
| Polyaryl Ether | X | ○ | X | X | X | ○ |
| Polybutylene | X | X | ○ | ○ | ○ | X |
| Polymethylpentene | X | X | X | X | X | X |
| Polystyrene | X | ○ | ○ | ○ | ○ | ○ |
| Polysulfone | X | X | X | X | X | ○ |
| Polyvinyl Chloride (PVC) | X | ○ | X | X | X | ○ |
| Styrene Acrylonitrile | X | ○ | X | X | X | ○ |
| Styrene Butadiene | ○ | ○ | ○ | ○ | ○ | ○ |
| Thermoplastic Polyester | X | ○ | X | X | X | ○ |
| Urethane Elastomer | ○ | X | X | X | X | ○ |

X indicates the fluid had no visible effect on plastic
○ indicates the fluid had a visible effect on plastic, with clouding, etching or crazing
*Trademark The invention being thus described, it will be obvious that the same may be varied in many ways. Such variations are not to be regarded as a departure from the spirit and scope of the invention and all such modifications are intended to be included within the scope of the following claims.

What is claimed is:

1. A method of bonding substrate surfaces with an adhesive composition comprising:
   treating a surface of at least one of said substrate surfaces with an adhesive promoter composition comprising a carrier which remains fluid at room temperature and present during the cure of said adhesive composition, said carrier being selected from the group consisting of acetic esters, benzoic diesters and phthalic esters and having at least one unsaturated bond present, and an adhesive promoter component which is capable of promoting the cure and/or enhancing adhesion of said adhesive composition and is miscible in said carrier;
   applying an adhesive composition to the surface of at least one of the substrates; and
   incorporating said carrier into said adhesive composition by placing said substrate surfaces in contact with each other to prevent release or said carrier from said adhesive composition and to bond said substrate surfaces together.

2. The method of claim 1 wherein the fluid carrier is selected from the group consisting of an acetic ester of $C_2$–$C_{18}$ alkenyl or aryl alcohol, an acetic ester of $C_3$–$C_{18}$ allyl alcohols, an acetic ester of $C_7$–$C_{18}$ alkylaryl alcohol, an acetic ester of $C_7$–$C_{18}$ arylalkyl alcohol and mixtures thereof.

3. The method of claim 1 wherein the fluid carrier is selected from the group consisting of linalyl acetate, diethyl phthalate, dipropyl phthalate, dibutyl phthalate, dioctyl phthalate, phenethyl acetate and mixtures thereof.

4. The method of claim 1 wherein the fluid carrier is a benzoic diester of an alkyl glycol.

5. The method of claim 4 wherein the fluid carrier is selected from the group consisting of ethylene glycol dibenzoate, diethylene glycol dibenzoate, propylene glycol dibenzoate, dibenzoate, dipropylene glycol dibenzoate and mixtures thereof.

6. The method of claim 1 wherein the adhesive promoter component is a base.

7. The method of claim 6 wherein the adhesive promoter component is an amine-containing compound.

8. The method of claim 7 wherein the amine-containing compound is selected from the group consisting of N,N-dimethyl-p-toluidine, t-butyl-2-benzothiazolesulfenamide, N-oxydiethylene benzothiazole-2-sulfenamide, 2,2'-(p-tolylimino) diethanol (hydroxyethyl-p-toluidine) and mixtures thereof.

9. The method of claim 8 wherein the amine-containing compound is present in amounts of about 0.01% to about 10% by weight.

10. The method of claim 9 wherein the amine-containing compound is present in amounts of about 0.5% to about 10% by weight.

11. The method of claim 1 wherein said adhesive promoter component is an organometallic substance.

12. A method of bonding substrate surfaces comprising:
   a) forming a curable layer between said substrate surfaces, said curable layer including (i) an adhesive composition; and (ii) an adhesive promoter composition which includes an adhesive promoter component and a carrier for said adhesive promoter component, said carrier being selected from the group consisting or acetic esters, benzoic diesters and phthalic esters and having at least one unsaturated bond present, said carrier being a plasticizer for said adhesive composition and being fluid at room temperature; and
   b) curing said curable layer between said substrates, whereby said adhesive promoter composition is incorporated into said adhesive composition to plasticize and promote cure of said adhesive composition and to prevent release of said carrier from said adhesive composition.

13. The method of claim 12 wherein said carrier is selected from the group consisting of an acetic ester of $C_3$–$C_{18}$ alkyl alcohol, an acetic ester of $C_3$–$C_{18}$ allyl alcohol, an acetic ester of $C_7$–$C_{18}$ alkylaryl alcohol, an acetic ester of $C_7$–$C_{18}$ arylalkyl alcohol and mixtures thereof.

14. The method of claim 12 wherein said carrier is selected from the group consisting of linalyl acetate, diethyl phthalate, dipropyl phthalate, dibutyl phthalate, dioctyl phthalate, phenethyl acetate and mixtures thereof.

15. The method of claim 12 wherein said carrier is a benzoic diester of an alkyl glycol having the formula OH—$(C_xH_{2x}O)_n$—H wherein x is 2-3 and n may be 1–10 provided the glycol remains fluid at room temperature.

* * * * *

UNITED STATES PATENT AND TRADEMARK OFFICE
CERTIFICATE OF CORRECTION

PATENT NO. : 6,001,213
DATED : December 14, 1999
INVENTOR(S) : Ju-Chao Liu

It is certified that error appears in the above-identified patent and that said Letters Patent is hereby corrected as shown below:

At column 1, line 6, the printed patent incorrectly reads "This is a continuation of Application No...."; the patent should read --This is a continuation of copending Application No...--.

Signed and Sealed this

Twelfth Day of December, 2000

Attest:

Q. TODD DICKINSON

*Attesting Officer*　　　　*Director of Patents and Trademarks*